United States Patent [19]
Mizobuchi et al.

[11] Patent Number: 5,828,912
[45] Date of Patent: Oct. 27, 1998

[54] DATA PRINTING APPARATUS

[75] Inventors: Koji Mizobuchi, Sagamihara; Hitoshi Maeno, Hichioji, both of Japan

[73] Assignee: Olympic Optical Co., Ltd., Tokyo, Japan

[21] Appl. No.: 821,866

[22] Filed: Mar. 21, 1997

[30] Foreign Application Priority Data

Apr. 2, 1996 [JP] Japan .................................. 8-080171
Mar. 10, 1997 [JP] Japan .................................. 9-054746

[51] Int. Cl.⁶ .................................................. G03B 17/24
[52] U.S. Cl. ......................... 396/310; 396/318; 396/434
[58] Field of Search .................................. 396/310, 315, 396/316, 317, 318, 434

[56] References Cited

U.S. PATENT DOCUMENTS 3,788,201  1/1974  Abell ........................................ 396/315
4,402,588  9/1983  Khait et al. ............................... 396/315
5,493,331  2/1996  Takahashi et al. ....................... 348/157

FOREIGN PATENT DOCUMENTS

3-121439  5/1991  Japan .

Primary Examiner—David M. Gray
Attorney, Agent, or Firm—Frishauf, Holtz, Goodman, Langer & Chick

[57] ABSTRACT

A first timer unit generates a first time-measurement output by performing a first timer operation. A second timer unit generates a second time-measurement output by performing a second timer operation different from the first timer operation by the first timer unit. A printing unit prints at least one of the first and second time-measurement outputs generated by the first and second timer units on a film upon film exposure.

30 Claims, 8 Drawing Sheets

DATA PRINTING APPARATUS

BACKGROUND OF THE INVENTION

The present invention relates to a data printing apparatus for, e.g., a camera and, more particularly, to a data printing apparatus for printing various data at different positions on each frame of a film.

In general, most of cameras comprise data printing apparatuses for printing calendar data such as "year, month, day" or the like or a simple message using English letters in the corner on each frame of a film.

Printing of this printing apparatus is attained using a liquid crystal or light-emitting diode (LED).

For example, in the case of the liquid crystal, light is perpendicularly incident from a light source such as a lamp, LED, or the like arranged behind a liquid crystal display (LCD) onto the LCD, and an optical image transmitted through the transparent portion of the LCD is printed as data on the film surface.

On the other hand, when the LED is used, light-emitting segments required for making up characters to be printed, which are prepared in advance, are caused to flicker at predetermined feed distance intervals or time intervals in accordance with feeding of the film, thus printing data on the film surface.

As the prior art, for example, Jpn. Pat. Appln. KOKAI Publication No. 3-121439 discloses a technique for realizing printing of one or a plurality of data on the photographing frame.

In this prior art, upon printing a plurality of data, printing is performed by stopping the film feed motor a plurality of number of times corresponding to the designated number of data to be printed from when the release switch is turned on until feeding for one frame is complete.

When "year, month, day" and "time" are to be printed ("print mode 2" described in Jpn. Pat. Appln. KOKAI Publication No. 3-121439 above), data "time" is printed immediately after the release switch is turned on.

Furthermore, the number of perforations is counted during feeding, and when the number of perforations has reached a predetermined value, the film feed motor is temporarily stopped to print data "year, month, day".

In this prior art, the data to be printed such as "year, month, day", "time", and the like are temporarily saved in a memory unit in correspondence with the selected print mode.

When the data to be printed is read out from the memory unit immediately before printing, and printing is performed, the contents of the printed data are simultaneously displayed on an LCD display.

In the conventional printing technique described above, when printing is performed, the motor must be stopped during film feeding, resulting in cumbersome control and an increase in time lag.

Furthermore, in this conventional technique, the contents of the saved data to be printed are read out to a data printing control circuit in each printing operation in correspondence with the print mode, and cumbersome procedures are required, resulting in poor controllability.

In particular, in this conventional technique, as for printing "time", the data to be printed is read out from the memory unit immediately before printing, and is displayed on the LCD simultaneously with printing, thus disturbing real-time processing.

In this conventional technique, since time display is made on the LCD to also indicate the data printing position in the print mode alone, the user may feel inconvenienced if he or she wants to know, e.g., the elapse of time as time goes by.

As described above, according to the conventional technique, the data printing control procedure is complicated, and the data to be printed are only symbols and the number of frames in addition to the date and time.

BRIEF SUMMARY OF THE INVENTION

It is the first object of the present invention to provide a data printing apparatus which can print, on a film, a time-measurement output such as a lap time from a predetermined timing or the like in addition to the date and time upon exposure.

It is the second object of the present invention to provide a data printing apparatus which allows the user to visually confirm the data to be printed.

It is the third object of the present invention to provide a data printing apparatus which can print, on a film, a time-measurement output such as a lap time from a predetermined timing or the like in addition to the date and time upon exposure.

According to the first aspect of the present invention, there is provided a data printing apparatus comprising:

first timer means for generating a first time-measurement output by performing a predetermined first timer operation;

second timer means for generating a second time-measurement output by performing a second timer operation different from the first timer operation of the first timer means; and printing means for printing at least one of the first and second time-measurement outputs generated by the first and second timer means on a film in an exposure operation of the film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

The preferred embodiments of the present invention will be described in detail hereinafter with reference to the accompanying drawings.

Figure 1:
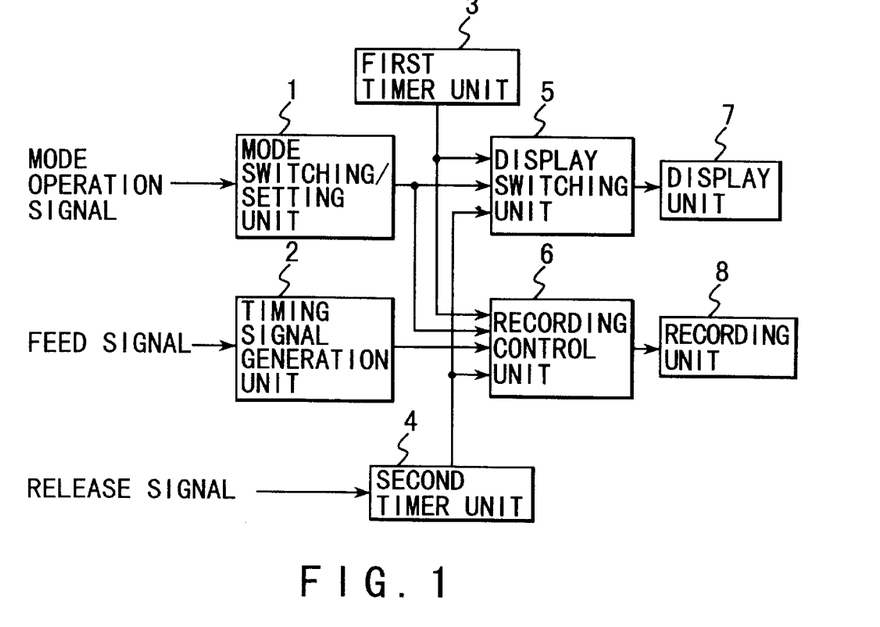
FIG. 1 is a schematic block diagram showing the arrangement of a data printing apparatus built in a camera according to the first embodiment of the present invention.

FIG. 1 shows the schematic arrangement of a data printing apparatus built in a camera according to the first embodiment of the present invention. The data printing apparatus of the first embodiment will be described below.

The data printing apparatus comprises a mode switching/setting unit 1 for generating a switching signal for setting a corresponding mode in accordance with a mode operation signal generated upon selection of a predetermined mode set at the camera with the data printing apparatus, a timing signal generation unit 2 for generating timing signals synchronous with time-series pulse signals successively generated in response to a film feed signal, a first timer unit 3 for measuring the time such as "year, month, day" as a date, a second timer unit 4 which performs measurements of the stop time from the beginning to the end of the measurement like a stopwatch (such operation mode will be referred to as a single recording mode hereinafter) or measurements of the lap time from the beginning of the measurement, and performs initialization or starts measurements of the time different from the first timer unit 3 in synchronism with a release signal, a display unit 7 for displaying the output from one of the first and second timer units 3 and 4, a display switching unit 5 for controlling the display unit 7 to selectively display the output from the first or second timer unit 3 or 4 in accordance with the switching signal output from the mode switching/setting unit 1, a recording unit 8 for recording the output from the first or second timer unit 3 or 4, and a recording control unit 6 for selectively outputting one of the outputs from the first and second timer units 3 and 4 to the recording unit 8 in synchronism with the timing signals output from the timing signal generation unit 2 in accordance with the switching signal output from the mode switching/setting unit 1.

The data printing apparatus can display the contents of the data to be printed on the display unit 7 in real time using a plurality of timer units that independently perform their timer operations. Also, one of the timer units can provide a calendar function, and the other timer unit can provide a stopwatch function. Furthermore, upon film feeding, one or both the time-measurement data can be printed.

As will be described later, the data printing apparatus can automatically execute display and printing of the data to be printed in a predetermined camera mode without requiring any switching operation of the date mode, thus preventing printing errors.

Figure 2:
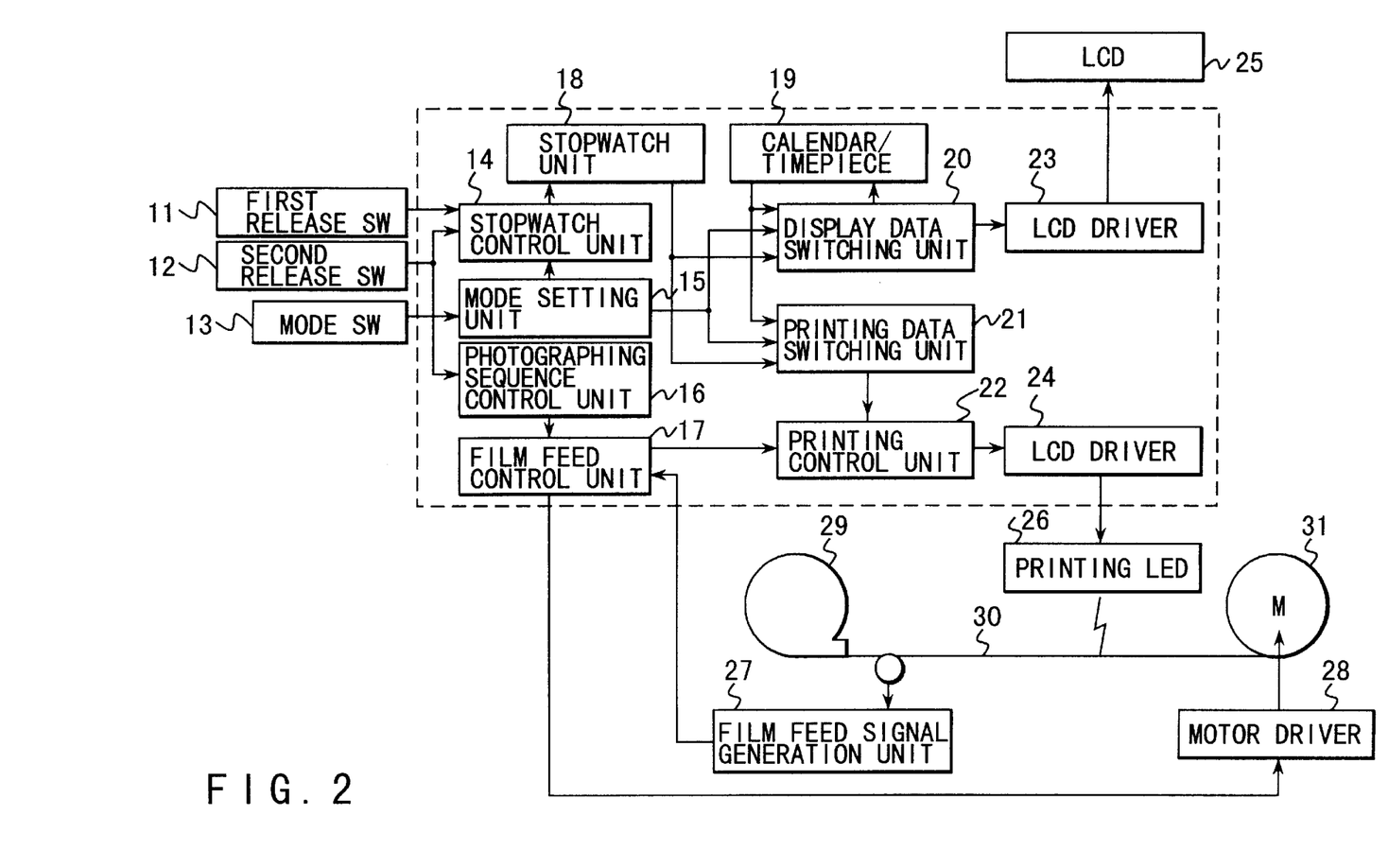
FIG. 2 is a detailed block diagram showing the arrangement of the data printing apparatus according to the first embodiment of the present invention.

FIG. 2 shows the detailed arrangement of the data printing apparatus of this embodiment. The data printing apparatus of this embodiment will be described in detail below.

The data printing apparatus is built in a camera, and has an arrangement in which the first and second timer units 3 and 4 shown in FIG. 1 are respectively replaced by a calendar/timepiece unit 19 and a stopwatch unit 18.

In this arrangement, a first release SW 11 and a second release SW 12 are connected to a stopwatch control unit 14.

A mode SW 13 is connected to a mode setting unit 15.

Upon operating the mode SW 13, the user can set or change the mode associated with "calendar/timepiece" or "stopwatch".

The mode setting unit 15 selectively sets the above-mentioned "single recording" mode and "lap recording" mode, and supplies the designated mode signal to the stopwatch control unit 14, a display data switching unit 20, and a printing data switching unit 21.

The stopwatch control unit 14 controls the start/stop of the operation of the stopwatch unit 18 in accordance with the mode signal supplied from the mode setting unit 15 and a release signal supplied from the first and second release SWs 11 and 12.

Furthermore, the second release SW 12 is connected to a photographing sequence control unit 16.

This photographing sequence control unit 16 supplies a control signal to a film feed control unit 17 in response to the release signal from the second release SW 12.

The display data switching unit 20 selectively supplies one or both the data output from the stopwatch unit 18 and the calendar/timepiece unit 19 to an LCD driver 23 in accordance with the mode signal output from the mode setting unit 15, and displays the data on an LCD 25 serving as a display device on which the user can finally, visually confirm the data.

The printing data switching unit 21 selectively supplies one or both the data output from the stopwatch unit 18 and the calendar/timepiece unit 19 to a printing control unit 22 in accordance with the mode signal output from the mode setting unit 15.

The film feed control unit 17 supplies a control signal to a motor driver 28 to drive a motor (inside a spool 31 in FIG. 2) connected to the spool 31.

Upon operation of the spool 31, a film 30 is fed from a patrone 29, and the film is wound up.

At this time, the moving amount of the film 30 is detected by a film feed signal generation unit 27.

The detected film moving amount signal is supplied to the film feed control unit 17 and is used in feedback control of film feeding.

The printing control unit 22 controls an LED driver 24 in response to the signals supplied from the printing data switching unit 21 and the film feed control unit 17 to drive a printing LED 26 used for printing data onto the film 30.

Note that the components within the range bounded by the dotted line in FIG. 2 need not be independent ones, but may be constituted by a one-chip microcomputer.

Of these components, the control operations made by the stopwatch control unit 14, the mode setting unit 15, the photographing sequence control unit 16, the film feed control unit 17, the display data switching unit 20, the printing data switching unit 21, and the printing control unit 22 may be implemented by software processing shown in the flow charts to be described later.

Although not shown, the stopwatch unit 18 may also serve as the calendar/timepiece unit 19. More specifically, the time on the calendar/timepiece unit 19 at the beginning of the timer operation may be stored, and thereafter, the difference between the times at the beginning and end of the timer operation of the calendar/timepiece unit 19 may be calculated to easily obtain the time elapsed.

In this case, the timer operation of the stopwatch 18 can be implemented by equivalent software, needless to say.

Figure 3:
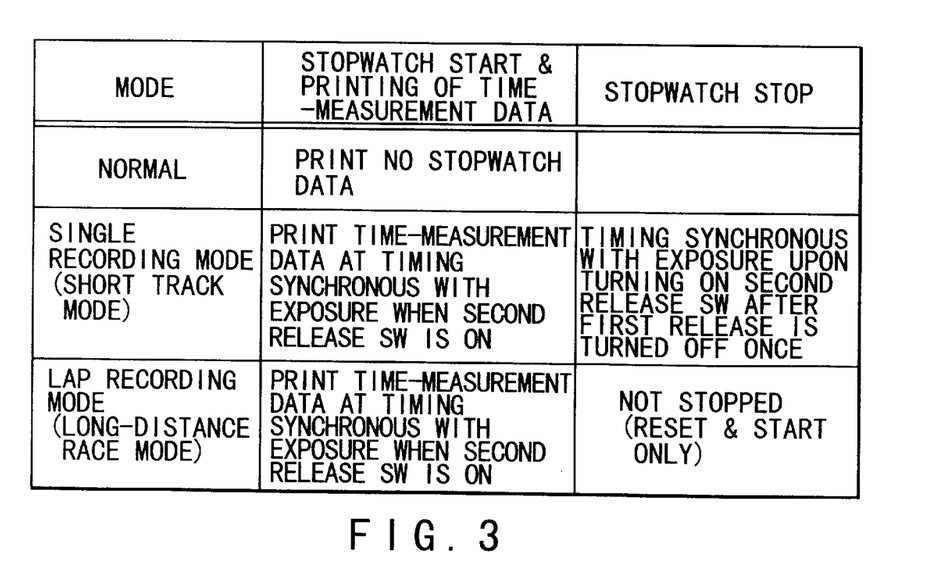
FIG. 3 is a table for explaining the modes to be set by a mode setting unit according to the first embodiment of the present invention, and the control of a stopwatch unit and time-measurement data printing in the individual modes.

FIG. 3 summarizes the modes set by the above-mentioned mode setting unit 15, and the control of the stopwatch unit 18 and time-measurement data printing in the individual modes.

As shown in FIG. 3, as the modes for operating the stopwatch unit 18, the single recording mode and the lap recording mode are available.

As described above, in this embodiment, the "single recording" mode is the one for recording the time from the beginning to the end of the measurement, and mainly corresponds to data recording at the goal point of short-distance races or the like.

On the other hand, the "lap recording" mode is the one for recording the lap times from the beginning of the measurement, and mainly corresponds to data recording of lap times and the time at the goal point of long-distance races.

Of course, the present invention is not limited to such specific races, but may be used in data recording of changes over time in an object under examination if the photographer so wishes.

Figure 4:
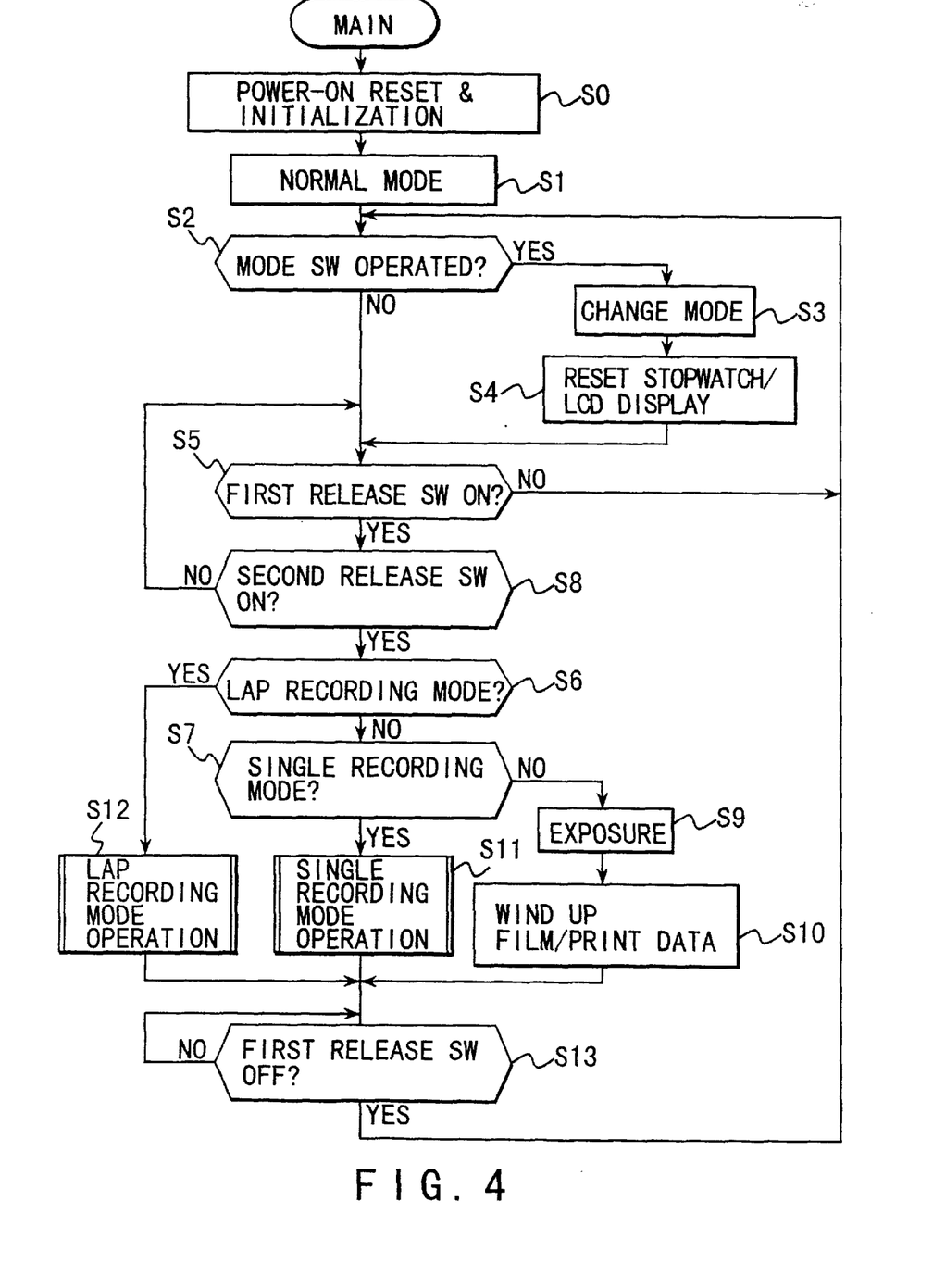
FIG. 4 is a flow chart showing the main routine of the data printing apparatus according to the first embodiment of the present invention.

The main routine of the data printing apparatus with the above arrangement will be described below with reference to the flow chart in FIG. 4.

In the main routine of the camera, predetermined initialization processing (step S0) is made after power-ON resetting.

At this time, the initial mode of the calendar/timepiece unit 19 which is started upon resetting and outputs the time-measurement output to be displayed on the LCD 25 is a normal mode (step S1).

The mode setting unit 15 checks if the mode SW 13 arranged on the camera is switched (step S2).

If the mode SW 13 is switched (YES), the mode is changed (step S3), and a mode different from the current mode is set.

For example, if the current mode is the normal mode, the "single recording" mode or "lap recording" mode is set.

Furthermore, the stopwatch unit 18 is reset by the stopwatch control unit 14, and the LCD 25 makes stopwatch initial display if the "single recording" mode or "lap recording" mode is selected (step S4). Thereafter, the flow advances to step S5.

If it is determined in step S2 that the mode SW 13 is not switched (NO), the flow directly advances to step S5, and the stopwatch control unit 14 checks if the first release switch is turned on (step S5).

If the first release SW is not turned on (NO), the flow returns to step S2.

If it is determined in step S5 that the first release SW is turned on (YES), the control waits for the ON operation of the second release SW in step S8. If the ON operation of the second release SW is detected (step S8), it is checked if the "lap recording" mode is set (step S6).

If it is determined that the lap recording mode is set (YES), the sequence of the "lap recording" mode operation (to be described later) is executed (step S12).

If it is determined in step S6 that the "lap recording" mode is not set (NO), it is then checked if the "single recording" mode is set (step S7).

If the "single recording" mode is set (YES), the sequence of the "single recording" mode operation (to be described later) is executed (step S11).

If it is determined in step S7 that the "single recording" mode is not set (NO), the control starts the sequence operation of the normal mode and performs exposure processing (step S9).

Upon completion of the exposure processing, the film is wound up by the motor driver 28 via the film feed control unit 17, and at the same time, data is printed in the normal mode (step S10).

Upon completion of film wind-up and data printing, it is checked if the first release SW 11 is turned off (step S13). If the first release SW 11 is turned off, the flow returns to step S2.

Upon completion of the "lap recording" mode operation or "single recording" mode operation as well, if the first release SW 11 is turned off, the flow similarly returns to step S2.

Figure 5:
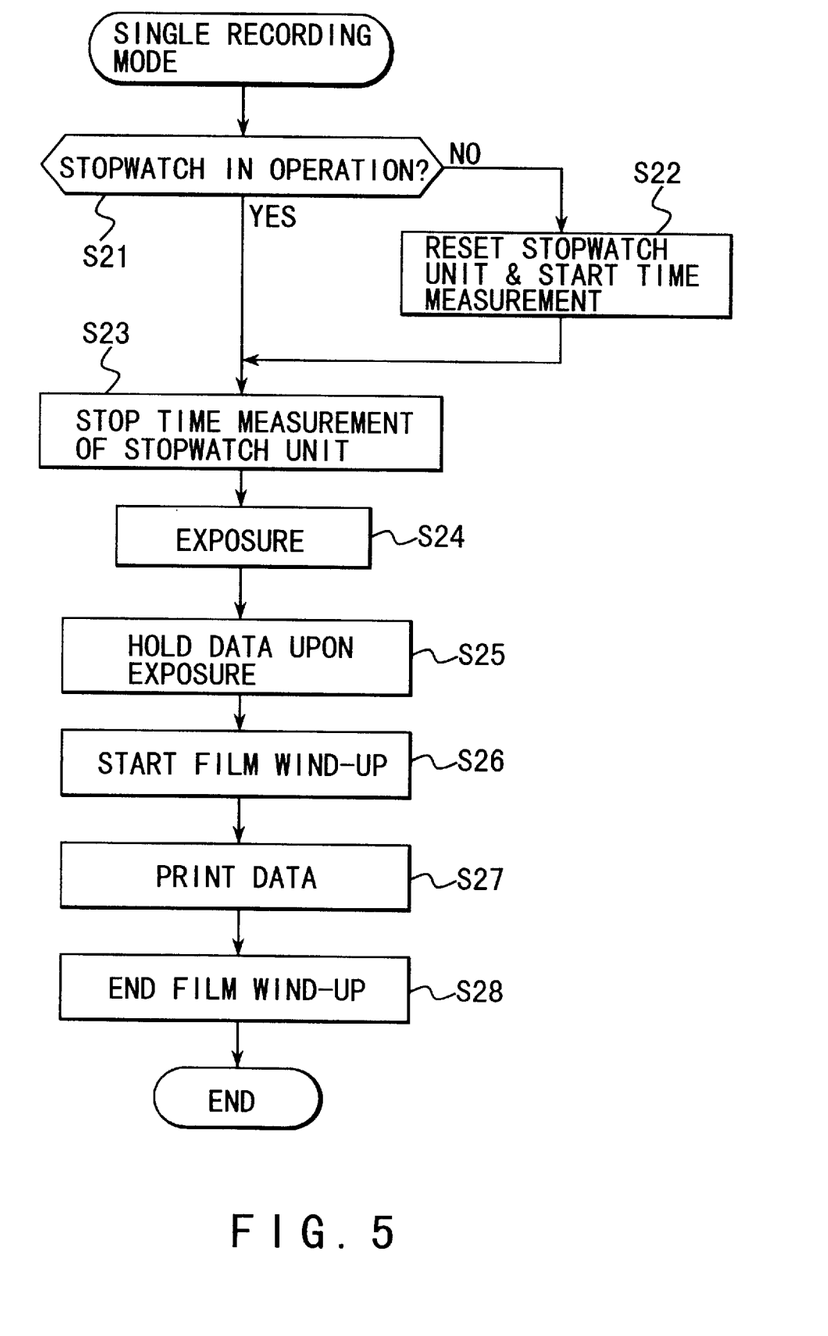
FIG. 5 is a flow chart for explaining in detail the "single recording mode" in FIG. 4.
Figure 6:
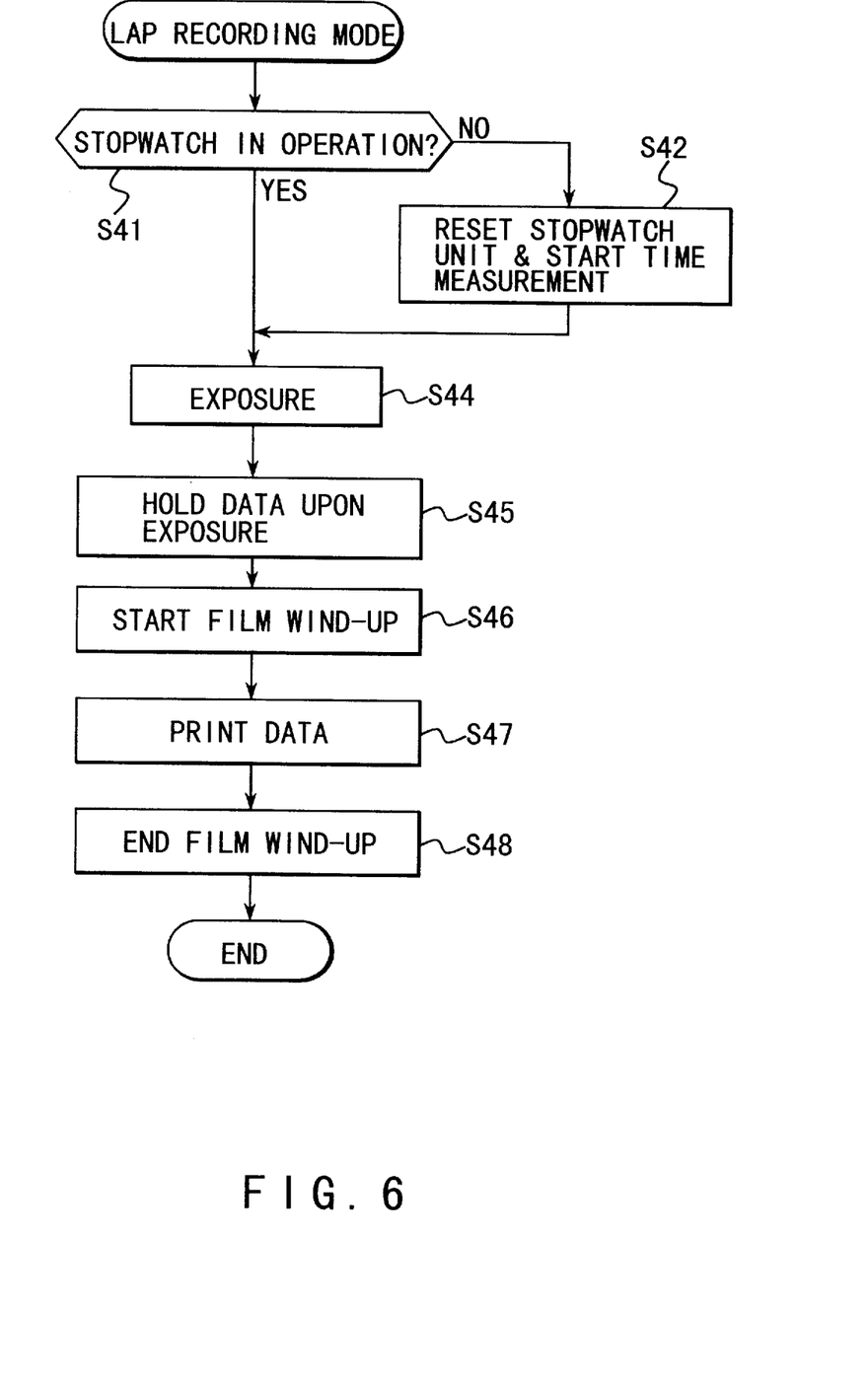
FIG. 6 is a flow chart for explaining in detail the "lap recording mode" in FIG. 4.

The operations in the individual modes will be described in detail below with reference to the flow charts in FIGS. 5 and 6, LCD displays illustrated in FIGS. 7A to 7E, and examples of the obtained pictures shown in FIGS. 8A to 8D.

The above-mentioned "normal mode" is the one in which the stopwatch unit does not operate, and corresponds to the normal photographing state.

In this case, in this embodiment, data "year, month, day" is set to be printed.

Figure 7A:
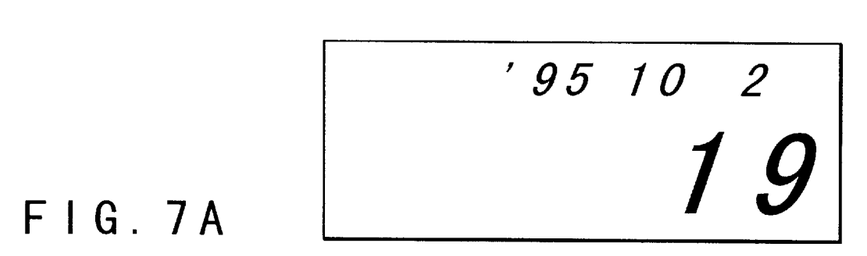
FIGS. 7A to 7E illustrate examples of LCD display in the first embodiment of the present invention.

FIG. 7A depicts display on the LCD 25 in the normal mode.

This display indicates that the photographing frame is the 19th frame, and the photographing date (year, month, day) is '95 10 2.

Since this normal mode is a general photographing mode, a detailed description thereof will be omitted.

As described above, the "single recording" mode or "lap recording" mode is selected upon switching the mode SW 13.

The "single recording" mode will be explained below with reference to the flow chart in FIG. 5.

In FIG. 2, the "single recording" mode is set upon switching the mode SW 13.

Figure 7B:
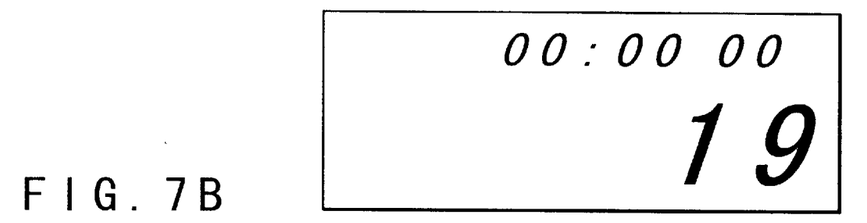

FIG. 7B illustrates display on the LCD 25 upon completion of resetting in the "single recording" mode.

This display indicates that the photographing frame is the 19th frame, and the measured time is 00:00 00.

Of course, the photographing date (year, month, day) may be displayed together.

When the photographer turns on the first release SW 11, the "single recording" mode operation is started.

It is checked if the stopwatch unit 18 is in operation (step S21).

Since the stopwatch unit is not in operation initially (NO), the operation of the stopwatch unit 18 is started, and the first exposure operation is made (step S24).

At this time, although the stopwatch control unit 14 has already started its operation, it holds the data measured by the stopwatch unit 18 at the timing synchronous with exposure as a value (00:00 00) in only the first exposure operation (step S25).

Upon completion of photographing, film wind-up is started (step S26).

Simultaneously with film wind-up, the held first photographing data (hour, minute, second) or the like is printed (step S27).

After the film has been fed by one frame, the wind-up operation is stopped (step S28) and the flow returns to the main routine.

Since the stopwatch unit 18 continues time measurements, the time measured continues to be displayed as the measured time data on the LCD 25 as time elapses.

Film wind-up for one frame and data printing performed at that time will be described in detail below.

The photographing sequence control unit 16 outputs a film feed request signal to the film feed control unit 17.

The film feed control unit 17 drives the spool 31 via the motor driver 28 to start feeding of the film 30 by one frame.

The moving amount of the film 30 can be measured by counting pulses generated by the film feed signal generation unit 27 by the film feed control unit 17.

When the moving amount of the film 30 has reached a predetermined amount (corresponding to the head position of the character string to be printed on the film 30), the film feed control unit 17 sends a printing request signal for one character (to be referred to as a printing synchronization signal hereinafter) to the printing control unit 22.

Upon receiving the printing synchronization signal, the printing control unit 22 sends the first character of the printing data selected by the printing switching unit 21 to the LED driver 24 to turn on the printing LED 26 in a pattern determined by the printing data.

With this operation, a light beam emitted by the printing LED 26 is projected onto the film 30, and the first character of the printing data is printed on the lower edge portion of the object image frame subjected to photographing immediately therebefore.

Thereafter, every time the film 30 has been fed by a predetermined amount (corresponding to the character interval of the character string to be printed on the film 30), the film feed control unit 17 supplies a printing synchronization signal for one character to the printing control unit 22 so as to print the printing data in units of characters on the lower edge portion of the object image frame.

Upon completion of printing of all the characters of the printing data selected by the printing data switching unit 21, the film feed control unit 17 controls the motor driver 28 to stop feeding when the total feed amount of the film 30 has reached one for one frame.

In this manner, a series of data printing and film feed control operations are complete.

Figure 8A:
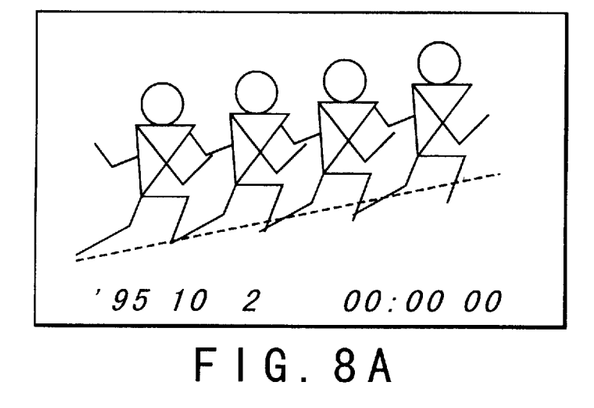
FIGS. 8A to 8D illustrate examples of the compositions of pictures taken in the first embodiment of the present invention, and data printed on these pictures.

FIG. 8A shows an example of the picture taken at that time.

The composition in FIG. 8A exemplifies the race start state, and the measured time: 00:00 00 and the date: '95 10 2 are printed on the lower portion of the picture.

Of course, the measure time alone may be printed. Note that the printing data are serially printed in the order of, e.g., "year, month, day" and "measured time" on the lower edge portion of the object image frame of the film.

In the case of FIGS. 8A to 8D, the "measured time" is printed as a 6-digit numeric value (hour, minute, second), but digits (four digits) other than the actually measured time may cease to be printed.

Also, the number of digits to be printed may be varied to an arbitrary length in correspondence with the measured time.

After the beginning of the operation of the stopwatch unit 18, when the first release operation (the operation for switching the second release SW from OFF to ON) is made, i.e., when the second exposure is performed, the "single recording" mode operation is restarted, and it is checked if the stopwatch unit 18 is in operation (step S21).

In the second exposure, since the stopwatch unit is in operation, the flow advances to step S23 to stop the time measurement of the stopwatch unit.

Thereafter, the same operation as in the first exposure operation is performed, and the flow then returns to the main routine.

In step S23, the normal mode may be automatically re-set an elapse of a predetermined period of time after the stopwatch unit 18 is stopped.

Figure 7C:
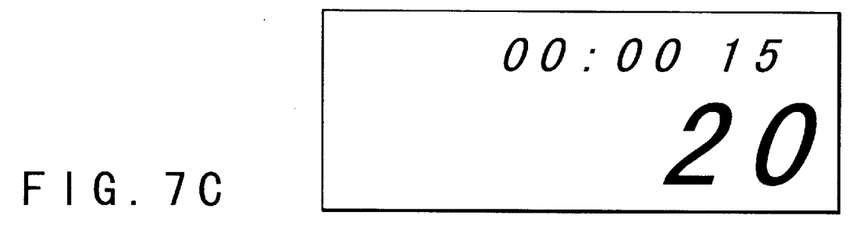

FIG. 7C shows LCD display at that time (the photographing frame: 20th frame, the measured time: 00:00 15).

Figure 8B:
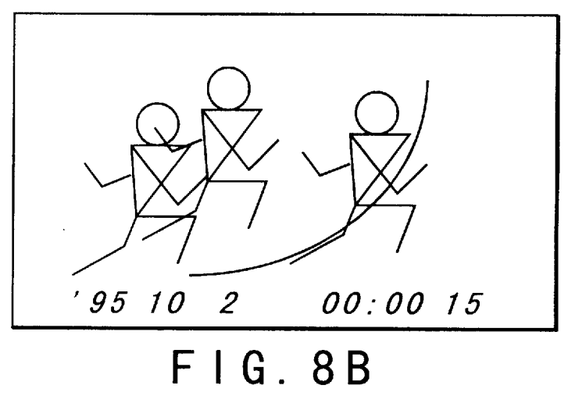

On the other hand, the picture taken at that time has a composition shown in FIG. 8B (the goal of the race; the measured time: 00:00 15 and the date: '95 10 2 are printed).

When the user operates the mode SW 13 to switch the mode to a mode other than the "single recording" mode in a state wherein the stopwatch unit maintains or suspends the timer operation, the mode setting unit 15 outputs the changed mode information to the stopwatch control unit 14, which resets the stopwatch unit 18 in response to the changed mode information.

The "lap recording" mode will be described below with reference to the flow chart in FIG. 6.

As described above, when the "lap recording" mode is selected by operating the mode SW 13, the stopwatch unit 18 is reset.

As shown in FIG. 7B, the LCD 25 displays 00:00 00.

When the photographer turns on the first release SW 11, the "lap recording" mode is started.

Thereafter, the operations in steps S44 to S48 are the same as those up to step S28 in the above-mentioned single recording mode.

It is checked if the stopwatch unit 18 is in operation (step S41).

Since the stopwatch unit is not in operation initially (NO), the operation of the stopwatch unit is started (step S42).

If the stopwatch unit is in operation (YES), the first exposure operation is performed (step S44), and data of the time (e.g., hour, minute, second) at the time of exposure is held (step S45).

Note that the time data measured by the stopwatch unit 18 is held as the value (00:00 00) in only the first exposure operation.

When film wind-up is started (step S46), the held data is printed (step S47).

After the film is wound by one frame, feeding is stopped and wind-up is completed (step S48).

As described above, in the "single recording" mode, the stopwatch operation is stopped immediately before the second exposure and the data printing operation after the time measurement is started. However, in the "lap recording" mode, the timer operation of the stopwatch unit is maintained, and the measured time data from the beginning of the timer operation is displayed on the LCD 25 as time elapses.

Upon every execution of the second and subsequent exposure operations, i.e., the release operations, the time measured by the stopwatch unit 18 which continuously operates is printed on the film every time the film is wound up by one frame.

This embodiment can be suitably used for, e.g., photographing scenes of a marathon in progress.

Figure 7D:
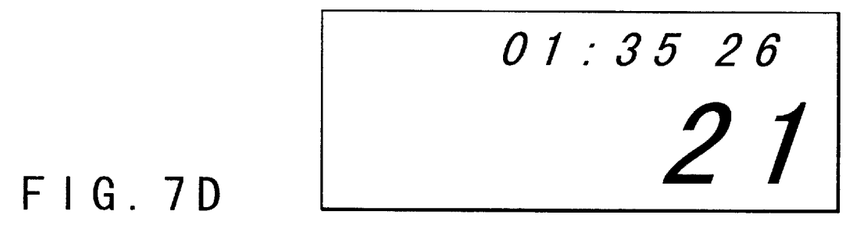
Figure 8C:
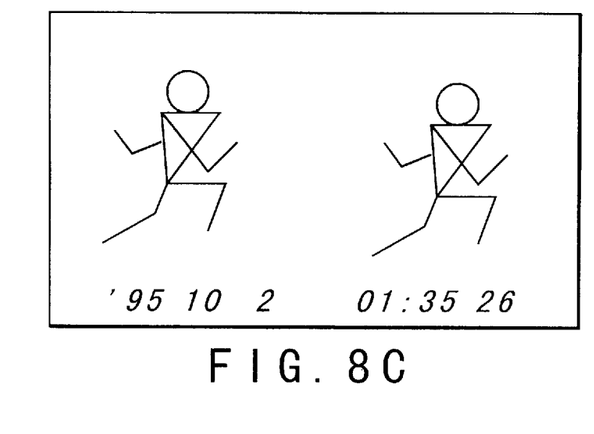

As scenes of the marathon in progress, if photographing is performed when the LCD 25 displays "photographing frame: 21st frame, measured time: 01:35 26", as shown in FIG. 7D, data "measured time: 01:35 26, date: '95 10 2" are printed on the film, as shown in FIG. 8C.

Figure 7E:
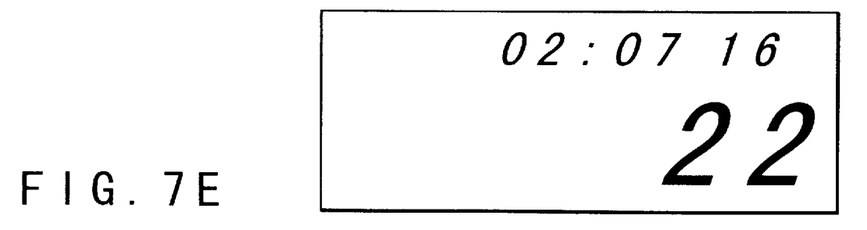
Figure 8D:
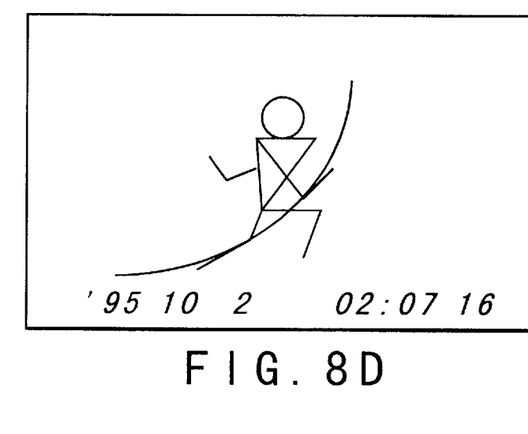

In the case of the goal of the marathon, for example, if photographing is performed when the LCD 25 displays "photographing frame: 22nd frame, measured time: 02:07 16", as shown in FIG. 7E, data "measured time: 02:07 16, date: '95 10 2" are printed on the film, as shown in FIG. 8D.

During this interval, the stopwatch unit continues the timer operation without being stopped.

As in the "single recording" mode, when the user operates the mode SW 13 to change the mode to a mode other than the "lap recording" mode while the stopwatch time measurement operation is maintained, the mode setting unit 15 outputs the changed mode information to the stopwatch control unit 14, which resets the stopwatch unit 18 in response to the changed mode information.

As described above, in this embodiment, the "single recording" mode is set upon photographing scenes of a race such as a short track that ends within a short period of time in, e.g., an athletic meeting, so as to record the times at the instances of the start and goal of the race on the pictures. In this way, such documentary pictures increase their significance. Even when repetitive recording is to be performed, documentary pictures at the start and goal can be easily taken by operating the release SW alone.

Upon photographing scenes in a race such as a marathon that lasts a long period of time, since the measurements of lap times and the like are required, the "flap recording" mode is set, and the lap times at arbitrary points between the start and goal can be recorded on pictures.

In addition, the operations during this interval can be easily attained by the operation of the release SW alone.

When the lap times are to be recorded like in the marathon, the lap recording mode must be maintained over a long period of time.

If a picture of a different object is to be taken during this interval, a lap time which is unnecessary in this case is recorded on the picture.

Accordingly, in order to avoid such problem, a mode for temporarily canceling only printing in the lap recording mode need only be provided.

That is, in this mode, time recording is canceled but the stopwatch unit 18 continues its operation.

For example, the lap recording mode can be temporarily canceled by operating another SW during the lap recording mode operation.

Alternatively, upon setting the lap recording mode, a temporary cancel mode (ON: cancel, OFF: not cancel) may be designated as a sub mode.

Furthermore, the operation of the stopwatch unit 18 may continue for a predetermined period of time after the lap recording mode is canceled (the normal mode is set).

Furthermore, the lap recording mode may be canceled by only power-ON resetting or the operation of the mode SW 13.

Figure 9:
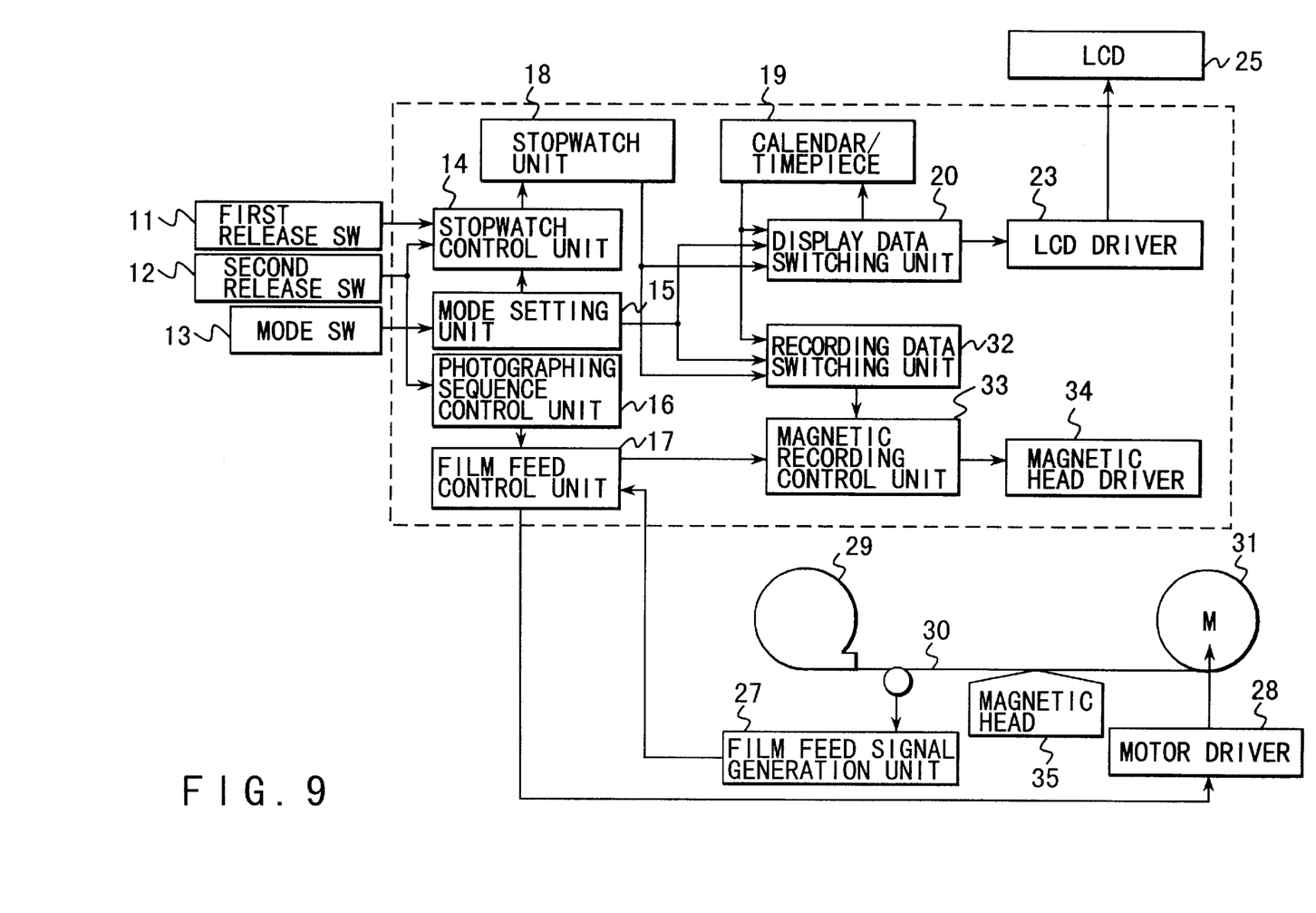
FIG. 9 is a block diagram showing the arrangement of a data printing apparatus according to the first embodiment of the present invention.

FIG. 9 shows the arrangement of a data printing apparatus according to the second embodiment of the present invention.

In the arrangement of the second embodiment, the same reference numerals denote components common to those in the arrangement of the first embodiment shown in FIG. 2, and a detailed description thereof will be omitted.

In the first embodiment, the data to be recorded such as time data (hour, minute, second) is optically recorded on the film using the LED, as shown in FIG. 2. However, in the second embodiment, the data to be recorded is magnetically recorded on a magnetic layer (not shown) as a coating on the surface of the film 30.

In this embodiment, a recording data switching unit 32 corresponds to the printing data switching unit 21, and has the same functions as those of the unit 21.

A magnetic recording control unit 33 corresponds to the printing control unit 22. The unit 33 supplies a recording signal to a magnetic head driver 34 in accordance with information supplied from the film feed control unit 17 and the recording data switching unit 32, and records one or both the data from the calendar/timepiece unit 19 and the stopwatch unit 18 on the magnetic layer as a coating on the film 30 using a magnetic head 35.

The data recorded on the magnetic layer on the film 30 is reproduced in the print process, and is printed on the front or rear surface of a print.

According to the second embodiment with the above arrangement, the data such as time data (hour, minute, second), date data (year, month, day), and the like associated with taken pictures can be recorded on the magnetic recording portion, and the recorded data can be reproduced and displayed after development.

In the above embodiments, the first timer unit has a calendar function, and the second timer unit has a stopwatch function. However, the functions of the first and second timer units are not limited to these specific functions. For example, the first timer unit may measure "Japan standard time", and the second timer unit may measure the local time of a principal city (e.g., New York, London, or the like) of another country.

Although a conventional apparatus having a single timer with a timer function is difficult to accurately measure time for the purpose of displaying and recording two different times, the data printing apparatus of this embodiment can accurately perform time measurements since it comprises two timer units.

As described in detail above, according to the embodiments of the present invention, a plurality of data ("date" and "time") can be printed within the photographing frame, and "time" can also be visually confirmed on the display device in real time. In addition, since "printing" is made during a series of film feed control operations, natural operations can be attained as in film feed control of a conventional camera.

As described above, according to the present invention, two different timer operations for a date and lap time can be accurately performed, and accurate time-measurement results can be printed. In addition, the time-measurement results to be printed can be easily visually confirmed.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

We claim:

1. A data printing apparatus comprising:

a first timer which generates a first time-measurement output by performing a predetermined first timer operation;

a second timer which starts to reset, or measures a lap time, in response to a release operation, for generating a second time-measurement output by performing a second timer operation different from the first timer operation of said first timer; and a printing unit for printing at least one of the first and second time-measurement outputs generated by said first and second timers on a film in an exposure operation of the film.

2. An apparatus according to claim 1, wherein said printing unit prints the time-measurement output from one of said first and second timers which is output in synchronism with the exposure operation of the film.

3. An apparatus according to claim 1, further comprising:

a display which displays time-measurement results of said first and second timers.

4. An apparatus according to claim 1, wherein:

said first timer serves as a calendar for measuring date data including at least one of year, month and day data; and said second timer serves as a stopwatch.

5. An apparatus according to claim 1, wherein said printing unit prints outputs from said first and second timers which are output in synchronism with the exposure operation of the film, onto the film.

6. An apparatus according to claim 3, wherein said display displays a time-measurement result from one of said first and second timers, which displayed result is printed by said printing unit.

7. An apparatus according to claim 1, further comprising:

mode setting means having at least (i) a single recording mode for recording an interval between two consecutive camera release operations, and (ii) a lap mode for recording lap times at timings of two or more consecutive release operations, and wherein said second timer starts the second timer operation at a predetermined timing.

8. An apparatus according to claim 7, wherein said printing unit starts the second timer operation in response to a first release operation and ends the second timer operation in synchronism with the film exposure operation, when said mode setting means sets the single recording mode.

9. An apparatus according to claim 7, wherein said printing unit starts the second timer operation in response to the release operation and outputs a time-measurement result in synchronism with the film exposure operation, when said mode setting means sets the lap recording mode.

10. A data printing apparatus for an image sensing apparatus, comprising:

a first timer which performs a predetermined first timer operation;

a second timer, which starts to reset or measures a lap time, in response to a release operation, for performing a second timer operation different from the first timer operation of said first timer;

a recording unit which prints data on a film or the like;

a timing signal generator which generates timing signals at predetermined periods in response to feeding of the film or the like; and a recording controller for selectively outputting signals from said first and second timers to said recording unit in response to the timing signals.

11. An apparatus according to claim 10, further comprising:

a display which displays one of the output signals from said first and second timers;

display switching means for selectively outputting one of the output signals from said first and second timers to said display; and mode switching/setting means for controlling said recording controller and said display switching means in correspondence with a mode switching operation.

12. An apparatus according to claim 10, wherein:

said first timer has a calendar function of measuring date data including at least one of year, month and day data; and said second timer has a function of measuring only time data including at least one of hour, minute and second data from an initialization timing.

13. An apparatus according to claim 10, wherein said second timer starts a time measurement in synchronism with a release signal for starting an exposure.

14. A camera comprising:

a first timer for measuring date data;

a second timer, which starts to reset, or measures a lap time, in response to a release operation, said second timer measuring the lap time from a predetermined timing to a film exposure timing; and a printing unit which prints at least one of the date data and the lap time on a film.

15. A camera according to claim 14, wherein said printing unit reads out and prints the date data and the lap time on the film in synchronism with a film exposure.

16. A camera according to claim 14, further comprising:

a display which displays a time-measurement result from one of said first and second timers, which time-measurement result is printed by said printing unit.

17. A data recording apparatus for a camera, comprising:

a manual setter for manually setting a time-measurement data recording operation mode for recording data onto a film;

a first timer which has a calendar function and outputs date data including at least one of year, month and day data upon film exposure;

a second timer which starts to reset, or measures a lap time, in response to a first camera release operation after said manual setter sets the time-measurement data recording operation mode, and outputs time-measurement data in response to a film exposure operation;

a recorder for recording at least one of data from the first and second timers on the film; and a controller for controlling the time-measurement data recording operation onto the film by said recorder on the basis of an output from said manual setter.

18. An apparatus according to claim 17, wherein said recorder optically records at least the time-measurement data on the film.

19. An apparatus according to claim 17, further comprising:

a film feeder for winding up the film by motor power at least after an exposure is completed; and a timing generator for generating a timing signal by detecting a film moving amount during film feeding, and wherein said controller controls said recorder in response to the timing signal to serially record at least time-measurement data on the film.

20. An apparatus according to claim 19, wherein said recorder magnetically records at least the time-measurement data on a magnetic recording track on the film.

21. A data recording apparatus for a camera, which records data on a film, comprising:

a plurality of timers, said plurality of timers including a timer which starts to reset, or measures a lap time, in response to a release operation, for individually measuring times and outputting data;

a controller for selecting and outputting output data from said plurality of timers; and a recorder for outputting data onto the film on the basis of the output from said controller.

22. An apparatus according to claim 21, wherein said recorder records a plurality of selected time-measurement outputs.

23. An apparatus according to claim 22, wherein said plurality of timers comprises a first timer for performing a time measurement associated with at least a date.

24. An apparatus according to claim 23, further comprising:

a time measurement starter for starting an operation of a second timer included in said plurality of timers, and wherein said second timer measures and outputs a time from a beginning of a time measurement to an exposure timing of a frame to be subjected to data recording.

25. An apparatus according to claim 24, wherein said time measurement starter starts the time measurement of said second timer in synchronism with an exposure of a first frame when said second timer is in a standby state.

26. An apparatus according to claim 24, further comprising:

a mode setter for setting said recorder in one of (i) a first recording mode for recording time-measurement data of said first timer on the film, and (ii) a second recording mode for recording at least time-measurement data of said second timer on the film; and wherein said time measurement starter starts the time measurement in synchronism with a first exposure after the second recording mode is set.

27. An apparatus according to claim 26, wherein said recorder includes:

initialization means for initializing said second timer upon changing of the recording mode, upon execution of a predetermined operation, or for each frame of the film.

28. A camera comprising:

a first timer unit having a calendar timer function;

a second timer unit which starts to reset, or measures a lap time, in response to a release operation;

a mode setting unit which manually sets one of a plurality of data recording modes including a lap recording mode;

a recording unit which records data on a film when the film is being fed by a film feeder; and a controlling unit which controls said recording unit such that at least the lap time measured by said second timer unit is recorded on the film, when said one of the plurality of data recording modes is set.

29. A camera according to claim 28, wherein said recording unit comprises an LED array provided in a predetermined segment arrangement, for optically printing the data on the film when the film is being fed.

30. A camera according to claim 28, wherein said recording unit comprises a magnetically writing device which magnetically records the data on a magnetic recording portion of the film.

* * * * *